United States Patent
Li et al.

(10) Patent No.: US 10,152,660 B2
(45) Date of Patent: Dec. 11, 2018

(54) SMART CARD READ/WRITE METHOD AND APPARATUS

(71) Applicant: Tencent Technology (Shenzhen) Company Limited, Shenzhen (CN)

(72) Inventors: Yongjie Li, Shenzhen (CN); Qiang Lu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/701,108

(22) Filed: Sep. 11, 2017

(65) Prior Publication Data
US 2017/0372180 A1 Dec. 28, 2017

Related U.S. Application Data

(63) Continuation-in-part of application No. PCT/CN2016/081931, filed on May 12, 2016.

(30) Foreign Application Priority Data

Oct. 9, 2015 (CN) .......................... 2015 1 0650235

(51) Int. Cl.
*G06K 19/06* (2006.01)
*G06K 17/00* (2006.01)
(Continued)

(52) U.S. Cl.
CPC ... *G06K 17/0003* (2013.01); *G06K 19/07701* (2013.01); *G06Q 20/3278* (2013.01);
(Continued)

(58) Field of Classification Search
CPC ............ G06K 19/07749; G07F 7/1008; G06Q 20/341
(Continued)

(56) References Cited

U.S. PATENT DOCUMENTS

2005/0261861 A1* 11/2005 Schahl ................ G01R 1/0416
702/122
2007/0228164 A1* 10/2007 Lu ......................... G06F 13/385
235/441
(Continued)

FOREIGN PATENT DOCUMENTS

CN 102136085 A 7/2011
CN 103455349 A 12/2013
(Continued)

OTHER PUBLICATIONS

Tencent Technology, ISR, PCT/CN2016/081931, Jul. 27, 2016, 2 pgs.
(Continued)

*Primary Examiner* — Ahshik Kim
(74) *Attorney, Agent, or Firm* — Morgan, Lewis & Bockius LLP

(57) ABSTRACT

A smart card read/write method is performed at a terminal, including: sensing a touch event of a smart card, and obtaining an application identifier corresponding to the touch event; searching for a third-party application link corresponding to the application identifier, and capturing and displaying a web page corresponding to the third-party application link, the web page comprising a function menu and an instruction script corresponding to options in the function menu being preselected from a preset standard script library; obtaining an option triggered in the function menu on the web page, and sending a smart card control request to a platform application server by executing an instruction script corresponding to the triggered option; and receiving a smart card control instruction returned by the platform application server, and invoking a corresponding interface function according to the smart card control instruction to read/write the smart card.

18 Claims, 7 Drawing Sheets

(51) Int. Cl.
    *G06K 19/077*    (2006.01)
    *G06Q 20/32*     (2012.01)
    *G06Q 20/34*     (2012.01)
    *G07F 7/08*      (2006.01)
    *G06K 19/04*     (2006.01)

(52) U.S. Cl.
    CPC ......... *G06Q 20/352* (2013.01); *G06Q 20/353* (2013.01); *G06Q 20/3567* (2013.01); *G07F 7/0886* (2013.01); *G07F 7/0893* (2013.01); *G06K 19/042* (2013.01)

(58) Field of Classification Search
    USPC ....................................................... 235/492
    See application file for complete search history.

(56) References Cited

U.S. PATENT DOCUMENTS

2013/0262764 A1* 10/2013 Jow .................. G06K 19/07732
                                                                        711/115
2014/0052617 A1     2/2014 Chawla et al.

FOREIGN PATENT DOCUMENTS

| CN | 103678508 A | 3/2014 |
|----|-------------|--------|
| CN | 105243407 A | 1/2016 |

OTHER PUBLICATIONS

Tencent Technology, Written Opinion, PCT/CN2016/081931, dated Jul. 27, 2016, 7 pgs.
Tencent Technology, IPRP, PCT/CN2016/081931, Apr. 10, 2018, 8 pgs.

\* cited by examiner

SMART CARD READ/WRITE METHOD AND APPARATUS

RELATED APPLICATIONS

This application is a continuation-in-part of application of PCT/CN2016/081931, entitled "SMART CARD READ/WRITE METHODS AND DEVICES" filed on May 12, 2016, which claims priority to Chinese Patent Application No. 201510650235.X, filed with the State Intellectual Property Office of the People's Republic of China on Oct. 9, 2015, and entitled "SMART CARD READ/WRITE METHOD AND APPARATUS", both of which are incorporated herein by reference in their entirety.

FIELD OF THE TECHNOLOGY

The present disclosure relates to the field of Internet technologies, and in particular, to a smart card read/write method and apparatus.

BACKGROUND OF THE DISCLOSURE

A smart card is also referred to as a CPU card, and an integrated circuit on the card includes a microprocessor CPU, a storage unit, and a chip operating system (COS). A CPU card installing a COS is equivalent to a microcomputer, and not only has a data storage function but also has functions such as command processing and data security protection.

A conventional smart card read/write device reads/writes a smart card by packaging a control instruction by using an application protocol data unit (APDU), a communication unit between a smart card and a smart card reader. A predefined control instruction is related to an application corresponding to a smart card. If another application needs to read/write the smart card for the application, a software development kit (SDK) of the application corresponding to the smart card needs to be loaded.

For example, for some platform applications, if a platform application needs to integrate a function of reading/writing multiple smart cards, for example, the platform application needs to have a capability of reading/writing all of multiple smart cards such as a public transportation card, a meal card, and a shopping card, so that a user can perform a read/write operation on the multiple different smart cards only by installing a client of the platform application on a mobile phone, the client of the platform application needs to include an SDK corresponding to each supported smart card. If the platform application needs to extend services to support a function of reading/writing a new smart card, the client of the platform application on the mobile phone needs to be updated, and a corresponding SDK file needs to be added to an updated client.

Therefore, in conventional technologies, for a manner of reading/writing a smart card by a platform application that integrates a function of reading/writing multiple smart cards, a method for adding a function of reading/writing another smart card is excessively complex, in which an SDK file needs to be added and a client needs to be updated, leading to relatively poor extensibility.

SUMMARY

Based on this, to resolve the foregoing mentioned technical problem in the conventional technologies that extensibility is relatively poor for a manner of reading/writing a smart card by a platform application that integrates a function of reading/writing multiple smart cards, a first smart card read/write method is provided.

A smart card read/write method includes:

sensing a touch event of a smart card, and obtaining an application identifier corresponding to the touch event;

searching for a third-party application link corresponding to the application identifier, and capturing and displaying a web page corresponding to the third-party application link, the web page corresponding to the third-party application link including a function menu and an instruction script corresponding to options in the function menu, and the instruction script being preselected by a third-party application from a preset standard script library;

obtaining an option triggered in the function menu on the web page corresponding to the third-party application link, and sending a smart card control request to a platform application server by executing an instruction script corresponding to the triggered option; and receiving a smart card control instruction that is returned by the platform application server and that corresponds to the smart card control request, and invoking a corresponding interface function according to the smart card control instruction to read/write the smart card.

In addition, to resolve the foregoing mentioned technical problem in the conventional technologies that extensibility is relatively poor for a manner of reading/writing a smart card by a platform application that integrates a function of reading/writing multiple smart cards, a first smart card read/write apparatus is provided.

A smart card read/write apparatus includes:

a first smart card detection module, configured to sense a touch event of a smart card, and obtain an application identifier corresponding to the touch event;

a third-party application page display module, configured to: search for a third-party application link corresponding to the application identifier, and capture and display a web page corresponding to the third-party application link, the web page corresponding to the third-party application link including a function menu and an instruction script corresponding to options in the function menu, and the instruction script being preselected by a third-party application from a preset standard script library;

a trigger option obtaining module, configured to: obtain an option triggered in the function menu on the web page corresponding to the third-party application link, and send a smart card control request to a platform application server by executing an instruction script corresponding to the triggered option; and a first smart card read/write module, configured to: receive a smart card control instruction that is returned by the platform application server and that corresponds to the smart card control request, and invoke a corresponding interface function according to the smart card control instruction to read/write the smart card.

In addition, to resolve the foregoing mentioned technical problem in the conventional technologies that extensibility is relatively poor for a manner of reading/writing a smart card by a platform application that integrates a function of reading/writing multiple smart cards, a second smart card read/write method is provided.

A smart card read/write method includes:

sensing a touch event of a smart card, and obtaining an application identifier corresponding to the touch event;

displaying a page corresponding to the application identifier, the page including a predefined function menu;

obtaining a control instruction set corresponding to the application identifier, the control instruction set being a set of smart card control instructions that are preselected by a third-party application from a preset standard instruction set and that correspond to options in the function menu on the page corresponding to the application identifier; and obtaining an option triggered in the function menu on the page, obtaining a smart card control instruction that corresponds to the triggered option and that is in the control instruction set, and invoking a corresponding interface function according to the smart card control instruction to read/write the smart card.

In addition, to resolve the foregoing mentioned technical problem in the conventional technologies that extensibility is relatively poor for a manner of reading/writing a smart card by a platform application that integrates a function of reading/writing multiple smart cards, a second smart card read/write apparatus is provided.

A smart card read/write apparatus includes:

a second smart card detection module, configured to sense a touch event of a smart card, and obtain an application identifier corresponding to the touch event;

a platform application page display module, configured to display a page corresponding to the application identifier, the page including a predefined function menu;

a control instruction set obtaining module, configured to obtain a control instruction set corresponding to the application identifier, the control instruction set being a set of smart card control instructions that are preselected by a third-party application from a preset standard instruction set and that correspond to options in the function menu on the page corresponding to the application identifier; and a second smart card read/write module, configured to: obtain an option triggered in the function menu on the page, obtain a smart card control instruction that corresponds to the triggered option and that is in the control instruction set, and invoke a corresponding interface function according to the smart card control instruction to read/write the smart card.

The embodiments of the present disclosure have the following beneficial effects:

BRIEF DESCRIPTION OF THE DRAWINGS

To describe the technical solutions of the embodiments of the present disclosure or the existing technology more clearly, the following briefly introduces the accompanying drawings required for describing the embodiments or the existing technology. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some of the embodiments of the present disclosure rather than all of the embodiments. All other embodiments obtained by a person of ordinary skill in the art based on the embodiments of the present disclosure without creative efforts shall fall within the protection scope of the present disclosure.

Figure 1:
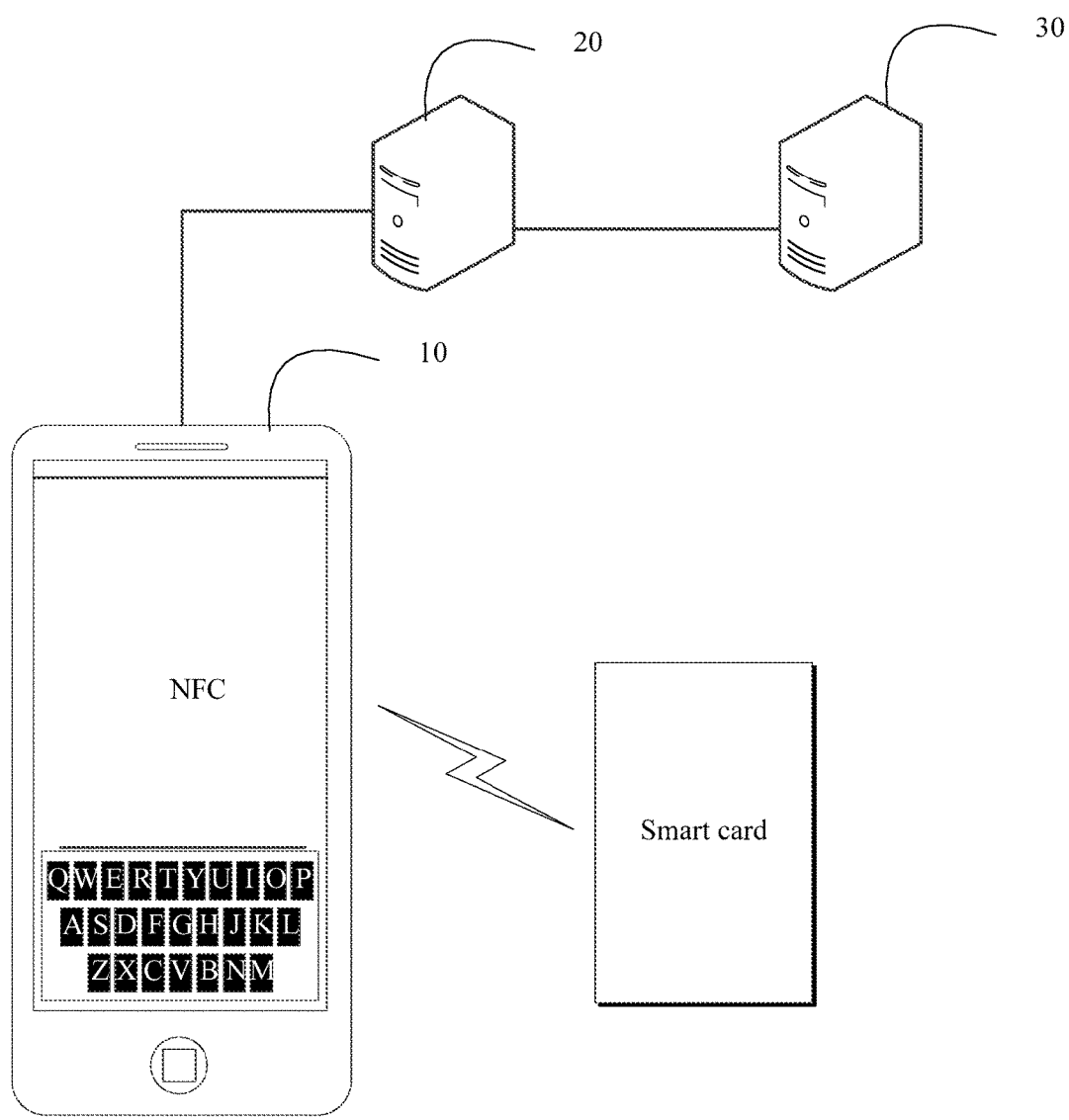
FIG. 1 is an architecture diagram of a platform application system according to some embodiments.

In an embodiment, as shown in FIG. 1, FIG. 1 shows a platform application system that integrates a function of reading/writing a smart card (in another embodiment, the system may also be used as a system having a platform application characteristic). A platform application is an application that provides a standard instruction interface or function interface for a third-party developer and that is used as an intermediate layer between a third-party application and an underlying computer program such as an operating system or a browser. The platform application may be, for example, a web application platform for Qzone, a game application platform for QQ Game Hall, WeChat, or another platform.

The third-party developer can implement service logic of the third-party application according to the standard instruction interface or function interface provided by the platform application. The generated third-party application may be deployed on the platform application. For example, on the web application platform for Qzone, the third-party application may be used as a web application (webapp) and deployed in a Qzone web page; on an application platform such as WeChat, the third-party application may be used as a light application and deployed on a WeChat mobile page.

In FIG. 1, a client program of a platform application may be installed in a terminal 10, a server program of the platform application may be installed on a platform application server 20. After the terminal 10 logs in to the platform application server 20 by using a user account, the terminal 10 may be connected to the platform application server 20. The platform application server 20 may store a session corresponding to the user account, and locate the corresponding terminal according to the session, thereby actively or passively interacting with the terminal.

A third-party application server 30 is a device used by a third-party application developer to publish a third-party application. When the third-party application developer is to publish a new third-party application or update a published third-party application, the third-party application developer can initiate a publishing or update request to the platform application server 20 by using the third-party application server 30.

In this embodiment, the client program of the platform application installed in the terminal 10 has a read/write function that matches smart cards for multiple application types, for example, a read/write function that may correspond to smart cards for multiple application types, such as a public transportation card for a public transportation application, a meal card for a canteen application, or a movie card for a movie application. When a user possessing the terminal 10 enables the client program of the platform application and interacts with smart cards for multiple application types separately, different pages corresponding to the application types of the smart cards may be displayed separately. The user can perform a corresponding read/write operation by entering information or selecting a key on a page.

That is, provided that the user installs the client program of the platform application, the user can perform a read/write operation on a smart card corresponding to an application that has registered in the platform application, so as to read/write smart cards for multiple application types by using a same terminal.

However, as described above, a technical problem in the conventional technologies that extensibility is relatively poor still exists for a manner of reading/writing a smart card by a platform application that integrates a function of reading/writing multiple smart cards. To resolve the technical problem, this application provides two smart card read/write methods. The following separately described the two methods.

In this embodiment, implementation of a first smart card read/write method may depend on a computer program. The computer program may be a platform application such as a social network application, an instant messaging application, an application market, an application manager, or a game hall. The computer program may run on the terminal 10 shown in FIG. 1. The terminal may be a computer device that is based on the Von Neumann architecture and that has a near field communication (Near Field Communication, NFC for short) function, for example, a device such as a smart phone, a tablet computer, a smart watch, a smart band, or a personal computer including an NFC sensor.

Figure 2:
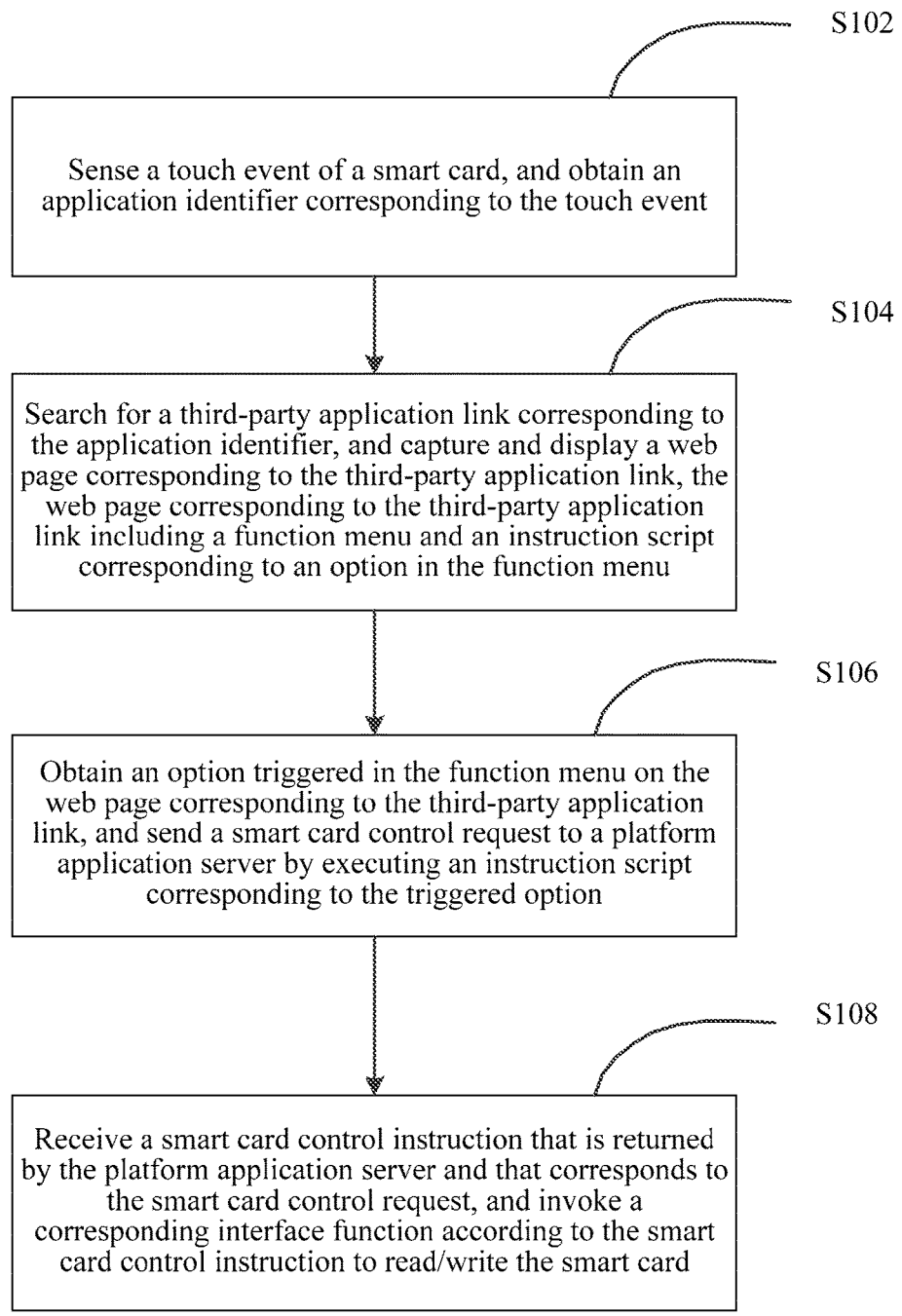
FIG. 2 is a flowchart of a first smart card read/write method according to some embodiments.

Specifically, as shown in FIG. 2, the first smart card read/write method includes operation S102 to operation S108.

Operation S102: Sense a touch event of a smart card, and obtain an application identifier corresponding to the touch event.

As described above, a smart card (CPU card) is an integrated circuit device having a smart card chip. A smart card read/write chip is installed in the terminal, and a client program of an platform application includes a driver program of the smart card read/write chip. When a smart card is in contact with or is put close to the terminal, the driver program of the smart card read/write chip in the client program of the platform application can sense a touch event of the smart card.

In this embodiment, a near field communication chip may be installed on the smart card, and the smart card read/write chip in the terminal may be the near field communication chip. The terminal can sense a near field communication signal, to obtain the touch event of the smart card according to the near field communication signal.

After the smart card is put close to the terminal and interacts with the terminal by using the NFC signal, an application identifier that is stored on and corresponds to the smart card and that is used for representing an application type corresponding to the smart card is sent to the terminal by using the NFC signal. The terminal receives the NFC signal by using the NFC chip. When the smart card is produced, the application identifier has been prestored in a memory of the smart card. The smart card reads the application identifier by reading the memory of the smart card. After the NFC chip in the terminal receives the NFC signal including the application identifier, the generated touch event of the smart card includes the application identifier. Therefore, the application type corresponding to the smart card can be learned.

For example, if a user puts public transportation cards corresponding to two different applications close to a mobile phone terminal based on this embodiment, the mobile phone terminal can find two touch events by means of NFC detection, and can extract application identifiers included in the touch events to distinguish between the public transportation applications respectively corresponding to the public transportation cards.

Operation S104: Search for a third-party application link corresponding to the application identifier, and capture and display a web page corresponding to the third-party application link, the web page corresponding to the third-party application link including a function menu and an instruction script corresponding to options in the function menu, and the instruction script being preselected by a third-party application from a preset standard script library.

In this embodiment, to publish the third-party application, the third-party application needs to be registered on a platform application server. During registration, a third-party application link and an application identifier of the third-party application need to be submitted. In this way, a mapping relationship between the application identifier and the third-party application link is established on the platform application server. The platform application server may save the registered application identifier and the third-party application link corresponding to the application identifier in an application mapping table. If the third-party application developer needs to modify the third-party application link in a later stage, the third-party application developer may send a request to the platform application server to update the application mapping table stored on the platform application server.

When the terminal queries the third-party application link corresponding to the application identifier extracted from the touch event, the terminal may send the application identifier to the platform application server. The platform application server searches the stored application mapping table for the third-party application link corresponding to the uploaded application identifier, and returns the third-party application link to the terminal.

Optionally, the terminal may alternatively download and cache the application mapping table that is on the platform application server in advance, and then update the application mapping table by regularly accessing the platform application server. The query step can be speeded up and execution efficiency can be improved by locally caching the application mapping table in the terminal.

After obtaining the third-party application link corresponding to the application identifier in the touch event, the terminal may send a web access request to a third-party application server corresponding to the third-party application link, to obtain a web page corresponding to the third-party application link (which is equivalent to opening the link in a web page and jumping to a corresponding page). The page is predefined by a third-party application developer according to service logic of the third-party application, and the page may include a function menu. The function menu may include multiple options.

For example, in an application of a public transportation card, when the user puts the public transportation card close to the terminal, a page of a public transportation system application (a third-party application based on the platform application) corresponding to the public transportation card is displayed. The page is self-designed and self-defined by the third-party application developer, and is stored on the third-party application server. A function menu on the page may include options such as "checking a balance", "recharging", and "changing a password". The function menu on the page and the options included in the function menu are also self-defined by the third-party application developer according to service logic of the public transportation system application.

In this embodiment, a developer of the platform application may predefine that a standard instruction library or a standard function library for reading/writing a smart card is stored in the client program of the platform application, and then define that a standard script library corresponds to the standard instruction library or the standard function library and is stored on the platform application server.

For example, the standard instruction library or the standard function library in the client program of the platform application may include a function used for obtaining a physical card number. The platform application server publishes in advance a standard script library (for example, a standard script library JS-SDK in a WeChat application platform) that is defined by using a script language such as JavaScript. The standard script library includes a corresponding instruction script for invoking the function used for obtaining the physical card number.

When defining and designing a third-party application page, the third-party application developer may add, to a trigger event processing function for an option of "viewing a card number", the instruction script of the function used for obtaining the physical card number (the third-party application developer may learn the instruction script by using the standard script library published in the platform application, that is, learn the instruction script by querying an API of the platform application), thereby establishing a mapping relationship between an option in the function menu on the web page corresponding to the third-party application link and a corresponding instruction script. When the option is triggered, the terminal executes a script corresponding to the option.

Operation S106: Obtain an option triggered in the function menu on the web page corresponding to the third-party application link, and send a smart card control request to a platform application server by executing an instruction script corresponding to the triggered option.

Operation S108: Receive a smart card control instruction that is returned by the platform application server and that corresponds to the smart card control request, and invoke a corresponding interface function according to the smart card control instruction to read/write the smart card.

As described above, after the terminal finds the third-party application link corresponding to the application identifier included in the touch event of the smart card, and accesses the third-party application link to load and display the web page that is defined and designed by the third-party application developer, the user can browse the web page and the function menu on the web page. If the user triggers an option in the function menu by means of clicking and sliding, the terminal executes an instruction script corresponding to the option by using a script engine (for example, if the instruction script is a JavaScript script, the JavaScript script is executed by using a JavaScript script interpreter).

After executing the instruction script, the terminal initiates the smart card control request to the platform application server. After receiving the smart card control request, the platform application server may obtain an instruction identifier in the standard instruction library or a function name in the standard function library corresponding to the instruction script.

As described above, if the option triggered by the user is "viewing a card number", the terminal executes an instruction script that is predefined on the web page by the third-party application developer according to the standard script library, and then sends a smart card control request for "viewing the card number" to the platform application server. After receiving the smart card control request, the platform application server may obtain a smart card control instruction corresponding to the smart card control request, and then send the smart card control instruction to the terminal.

After receiving the smart card control instruction, the terminal can execute the function used for obtaining a physical card number, where the function may be used to invoke a smart card read/write driver program included in the client program of the platform application, send an APDU for reading the physical card number to the smart card by using an NFC signal, and then receive an APDU that includes the physical card number and that is returned by the smart card also by using an NFC signal, to obtain the physical card number and display the physical card number on the web page.

Figure 3:
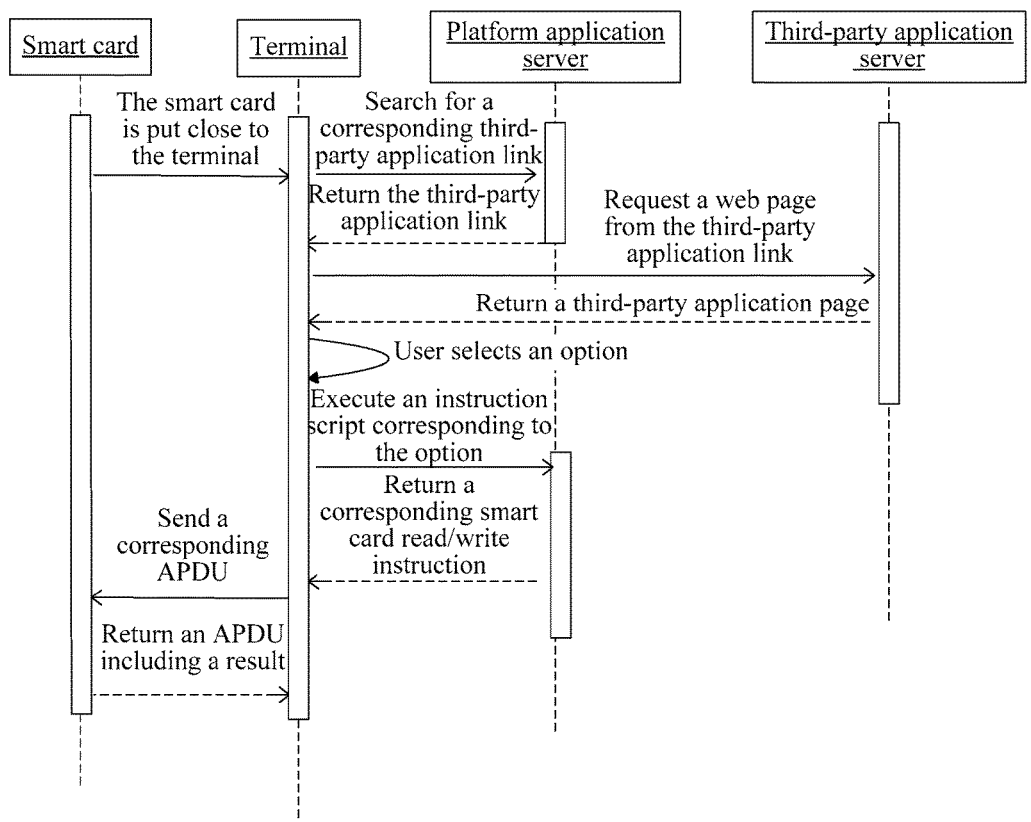
FIG. 3 is a schematic interaction diagram of a process of the first smart card read/write method according to some embodiments.

Specifically, an interaction process among the smart card, the terminal, the platform application server, and the third-party application server may be shown in FIG. 3.

In this embodiment, the operation of capturing and displaying, by the terminal, a web page corresponding to the third-party application link further includes:

detecting a loading completion event of the web page corresponding to the third-party application link; obtaining an instruction script invoked by an event processing function of the loading completion event; and executing the operation of sending a smart card control request to a platform application server by executing an instruction script corresponding to the triggered option.

That is, the third-party application developer may add, to an onload event of the web page, an instruction script selected from the standard script library, for example, an instruction script for reading particular data and storing the data, and immediately display the read data on the web page of the third-party application after the web page is loaded.

For example, if the user puts the public transportation card close to a smart mobile phone terminal, the smart mobile phone terminal immediately displays a page of a public transportation system application corresponding to the public transportation card, and may immediately displays, on the page, a balance in the public transportation card, thereby more quickly displaying information related to storage content of the smart card, and improving operation convenience.

In this embodiment, implementation of a second smart card read/write method may depend on a computer program. The computer program may be a platform application such as a social network application, an instant messaging application, an application market, an application manager, or a game hall. The computer program may run in the terminal 10 shown in FIG. 1. The terminal may be a computer device that is based on the Von Neumann architecture and that has a near field communication function, for example, a device such as a smart phone, a tablet computer, a smart watch, a smart band, or a personal computer including an NFC sensor.

Figure 4:
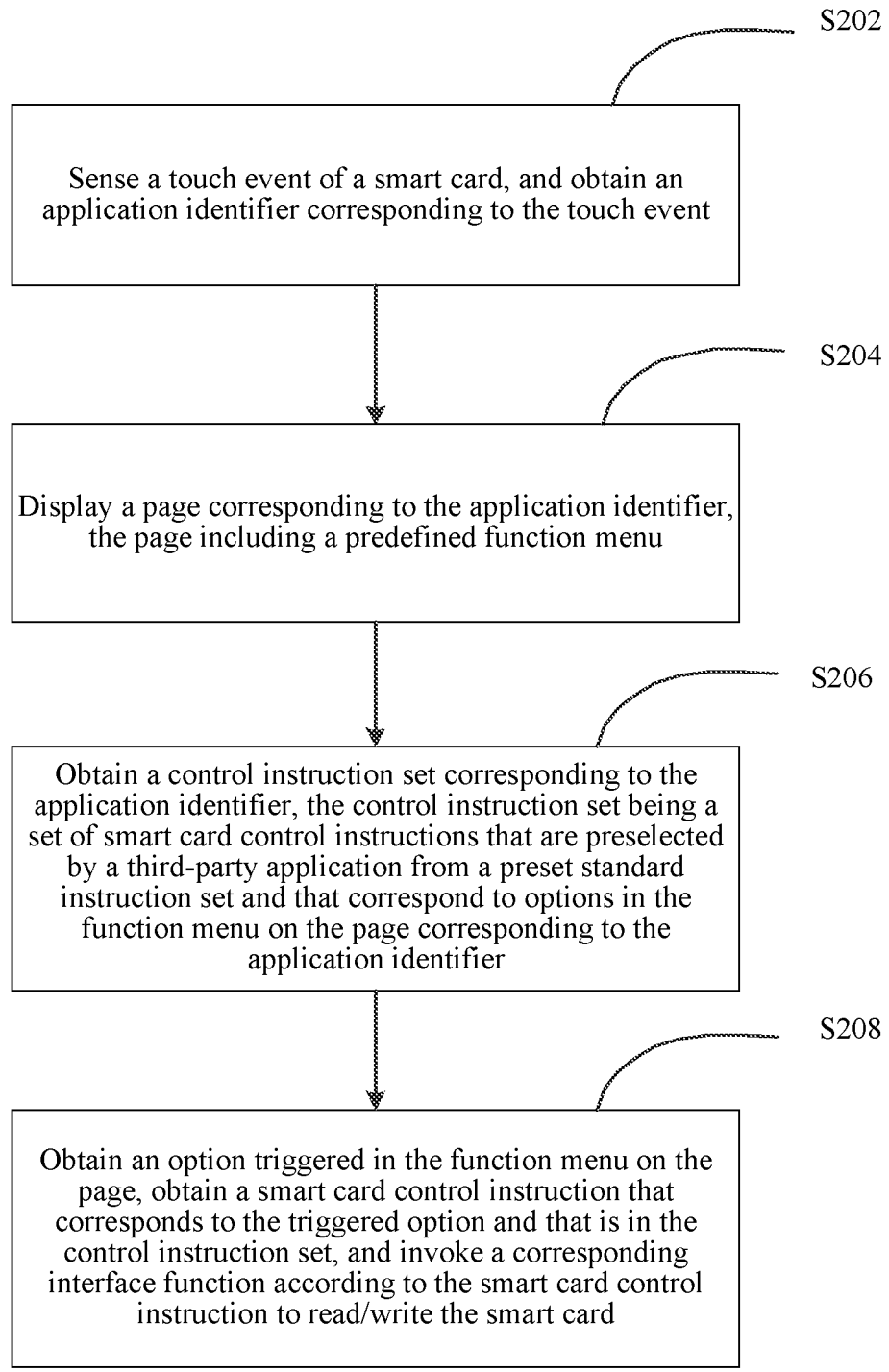
FIG. 4 is a flowchart of a second smart card read/write method according to some embodiments.

Specifically, as shown in FIG. 4, the second smart card read/write method includes operation S202 to operation S208.

Operation S202: Sense a touch event of a smart card, and obtain an application identifier corresponding to the touch event.

As described above, a smart card (CPU card) is an integrated circuit device having a smart card chip. A smart card read/write chip is installed in the terminal, and a client program of an platform application includes a driver program of the smart card read/write chip. When a smart card is in contact with or is put close to the terminal, the driver program of the smart card read/write chip in the client program of the platform application can sense a touch event of the smart card.

In this embodiment, a near field communication chip may be installed on the smart card, and the smart card read/write chip in the terminal may be the near field communication chip. The terminal can sense a near field communication signal, to obtain the touch event of the smart card according to the near field communication signal.

After the smart card is put close to the terminal and interacts with the terminal by using the NFC signal, an application identifier that is stored on and corresponds to the smart card and that is used for representing an application type corresponding to the smart card is sent to the terminal by using the NFC signal. The terminal receives the NFC signal by using the NFC chip. When the smart card is produced, the application identifier has been prestored in a memory of the smart card. The smart card reads the application identifier by reading the memory of the smart card. After the NFC chip in the terminal receives the NFC signal including the application identifier, the generated touch event of the smart card includes the application identifier. Therefore, the application type corresponding to the smart card can be learned.

For example, if a user puts public transportation cards corresponding to two different applications close to a mobile phone terminal based on this embodiment, the mobile phone terminal can find two touch events by means of NFC detection, and can extract application identifiers included in the touch events to distinguish between the public transportation applications respectively corresponding to the public transportation cards.

Operation S204: Display a page corresponding to the application identifier, the page including a predefined function menu.

After obtaining the application identifier in the touch event, the terminal may display the page corresponding to the application identifier. The page may be based on a web page, or may be based on an interface control of a GUI program. The page is defined and designed by a developer of the platform application, and is used for reading and writing related information of the smart card in the client program of the platform application.

For example, if meal cards for multiple canteen applications (which may be independent canteen systems self-developed by canteens in multiple regions) need to be managed on one page in the client program of the platform application, the developer of the platform application may self-design and self-define the page, and add a function menu related to catering to the page. The function menu may include multiple options. For example, options such as "checking a balance" and "recharging a meal card" may be included. It may also be understood as that the page defined by the developer of the platform application provides a standard service process for a smart card read/write operation of a third-party application. A third-party application developer can implement the function only by designing a corresponding control instruction set or read/write script according to the options on the page.

Operation S206: Obtain a control instruction set corresponding to the application identifier, the control instruction set being a set of smart card control instructions that are preselected by a third-party application from a preset standard instruction set and that correspond to options in the function menu on the page corresponding to the application identifier.

In this embodiment, the terminal may upload the obtained application identifier to a platform application server. The platform application server obtains a third-party application link corresponding to the application identifier, and captures, according to the third-party application link, a control instruction set of smart card control instructions corresponding to the options in the function menu.

The terminal receives the control instruction set that is of the smart card control instructions corresponding to the options in the function menu and that is returned by the platform application server.

In this embodiment, to publish the third-party application, the third-party application needs to be registered on a platform application server. During registration, a third-party application link and an application identifier of the third-party application need to be submitted. In this way, a mapping relationship between the application identifier and the third-party application link is established on the platform application server. The platform application server may save the registered application identifier and the third-party application link corresponding to the application identifier in an application mapping table. If the third-party application developer needs to modify the third-party application link in a later stage, the third-party application developer may send a request to the platform application server to update the application mapping table stored on the platform application server.

A third-party control instruction set is a set of smart card read/write instructions that are designed by the third-party application developer according to the options in the function menu defined by the developer of the platform application and that match a function of reading/writing a smart card for the third-party application.

In this embodiment, the developer of the platform application may predefine that a standard instruction library or a standard function library used for reading/writing the smart card is stored in a client of the platform application, and disclose an interface of the standard instruction library or the standard function library (for example, which may be disclosed by using a development document). The third-party application developer may define, based on a standard read/write function provided in the standard instruction library or the standard function library, an inbound parameter matching the smart card for the third-party application, to generate the control instruction set.

In this embodiment, a memory of the smart card may store data in a form of a mapping table, that is, a mapping table of a data type identifier and specific data (a data structure of a map type). The developer of the platform application predefines a standard function library for reading the memory of the smart card. A formal parameter of the standard library function includes a data type identifier, so as read specific corresponding data according to the inbound data type identifier. When defining the control instruction set, the third-party application developer may first select the standard library function, and then set an inbound parameter of the standard library function according to a smart card specification defined in the third-party application.

As described above, if a standard library function that is predefined by the developer of the platform application and that is used for reading the memory of the smart card is getData, a data type identifier that is of a balance and that is defined in a smart card for a first canteen application (the third-party application) is remaining, and a data type identifier that is of a balance and that is defined in a smart card for a second canteen application is money. When the smart card for the first canteen application is put close to the mobile phone terminal, a smart card read/write instruction corresponding to an option of "viewing a balance" on a displayed page may be getData: "remaining". When the smart card for the second canteen application is put close to the mobile phone terminal, a smart card read/write instruction corresponding to an option of "viewing a balance" on a displayed page may be getData: "money" (Specific instruction definition specifications may be defined by the developer of the platform application by means of syntax).

In another embodiment, the memory of the smart card may also store data according to a storage address number. The developer of the platform application predefines a standard library function for reading the memory of the smart card. A formal parameter of the standard library function includes a storage address number, so as read specific corresponding data according to the inbound storage address number. When defining the control instruction set, the third-party application developer may first select the standard library function, and then set an inbound parameter of the standard library function according to a smart card specification defined in the third-party application.

As described above, if a standard library function that is predefined by the developer of the platform application and that is used for reading the memory of the smart card is getData, a storage address that is of a balance and that is defined in a smart card for a first canteen application (the third-party application) is bit 1024 to bit 2048, and a storage address that is of a balance and that is defined in a smart card for a second canteen application is bit 0 to bit 1024. When the smart card for the first canteen application is put close to the mobile phone terminal, a smart card read/write instruction corresponding to an option of "viewing a balance" on a displayed page may be getData: 1024, 2048. When the smart card for the second canteen application is put close to the mobile phone terminal, a smart card read/write instruction corresponding to an option of "viewing a balance" on a displayed page may be getData: 0, 1024 (Specific instruction definition specifications may be defined by the developer of the platform application by means of syntax).

Operation S208: Obtain an option triggered in the function menu on the page, obtain a smart card control instruction that corresponds to the triggered option and that is in the control instruction set, and invoke a corresponding interface function according to the smart card control instruction to read/write the smart card.

As described above, if an option triggered by the user is "viewing a balance", and if the smart card that is put close to the mobile phone terminal is the smart card for the first canteen application, the obtained smart card read/write instruction may be getData: 1024, 2048. The terminal may invoke a getData function in the standard function library, use 1024 and 2048 as inbound parameters to execute the function, invoke a smart card read/write driver program included in the client program of the platform application, send an APDU that reads data to the smart card by using an NFC signal, and then receive an APDU that includes a balance and that is returned by the smart card also by using an NFC signal, to obtain the balance in the meal card and display the balance on the page.

As described above, if an option triggered by the user is "viewing a balance", and if the smart card that is put close to the mobile phone terminal is the smart card for the second canteen application, the obtained smart card read/write instruction may be getData: 0, 1024. The terminal may invoke a getData function in the standard function library, use 0 and 1024 as inbound parameters to execute the function, invoke a smart card read/write driver program included in the client program of the platform application, send an APDU that reads data to the smart card by using an NFC signal, and then receive an APDU that includes a balance and that is returned by the smart card also by using an NFC signal, to obtain the balance in the meal card and display the balance on the page.

Figure 5:
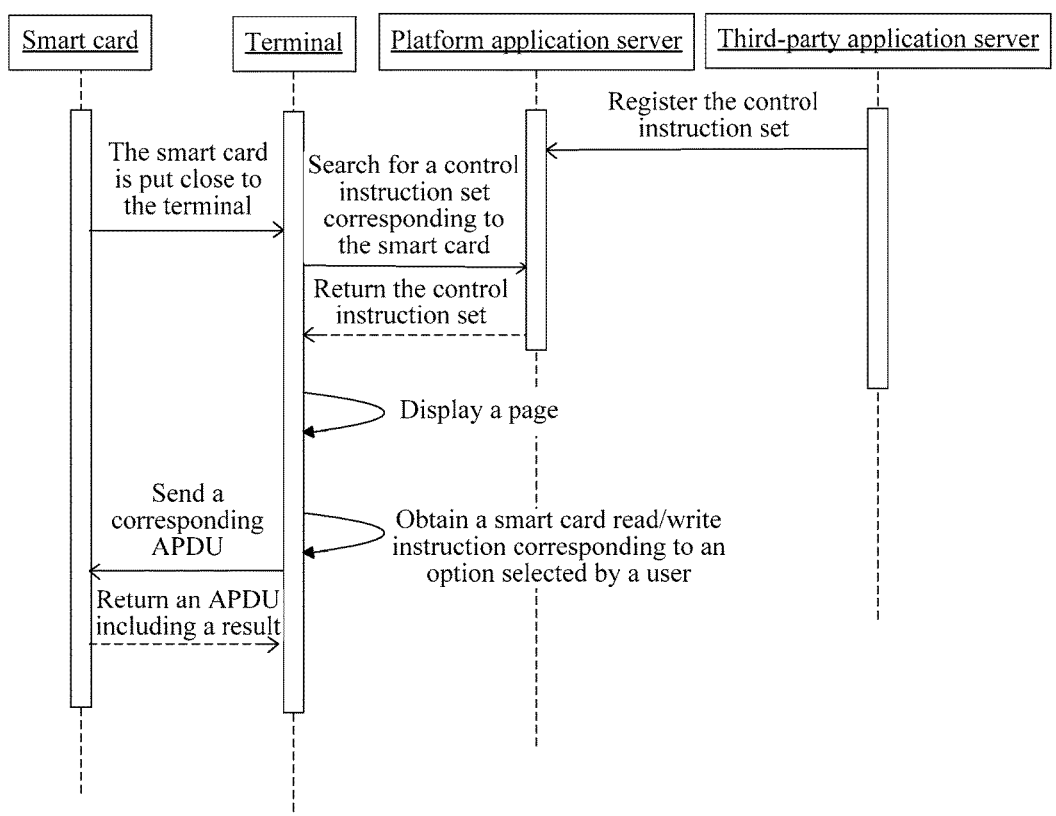
FIG. 5 is a schematic interaction diagram of a process of the second smart card read/write method according to some embodiments.

Specifically, an interaction process among the smart card, the terminal, the platform application server, and the third-party application server may be shown in FIG. 5.

In both the first and the second smart card read/write methods, the client program of the platform application on the terminal needs to include a standard function library or a standard instruction library for reading/writing a smart card. Regardless of an application type of the smart card, a function in the standard function library or the standard instruction library included in the client program of the platform application needs to be invoked for reading/writing.

A difference between the first smart card read/write method and the second smart card read/write method is as follows: To adapt to design specifications of smart cards for different third-party applications, content disclosed in the first smart card read/write method is a standard instruction script library, a third-party application developer can self-design a page according to a service in a third-party application, and also needs to collectively select, according to a service, corresponding instruction scripts from standard scripts disclosed in a platform application, and add a parameter matching the service; content disclosed in the second smart card read/write method is a standard function library or instruction library, a page is defined by a developer of a platform application, but a third-party application needs to select a suitable function from the standard function library or the standard instruction library according to a specific service corresponding to an option in a function menu on the page, and add a parameter matching the service.

However, on the whole, in both the first and the second smart card read/write methods, the client program of the platform application on the terminal needs to include a standard function library or a standard instruction library for reading/writing a smart card, a manner of performing an operation on the standard function library or the standard instruction library needs to be disclosed to a third-party application developer (a first method is using an instruction script, and a second method is direct disclosure), and a suitable smart card read/write instruction is defined by the third-party application developer for an option on a page according to service logic. Therefore, the first and the second smart card read/write methods are based on a same invention concept.

In addition, according to the first and the second smart card read/write methods, for a third-party application newly extended in a platform application, instead of self-developing a set of corresponding program packages for a smart card driver according to service specifications of the third-party application, a developer of the newly extended third-party application needs to self-define a page and configure an instruction script or set a parameter of a function in a standard function library according to a standard page, based on a standard script library or the standard function library that has been provided by the platform application, to associate different services with a smart card read/write instruction that can be finally recognized by a client program of the platform application. Therefore, the program packages for the smart card driver related to the newly extended third-party application do not need to be installed on a terminal. This not only saves storage space of the terminal and avoids storage of a redundant driver package, but also facilitates extension of a new application (provided that the new application is registered on a platform application server), thereby improving extensibility of the platform application.

Figure 6:
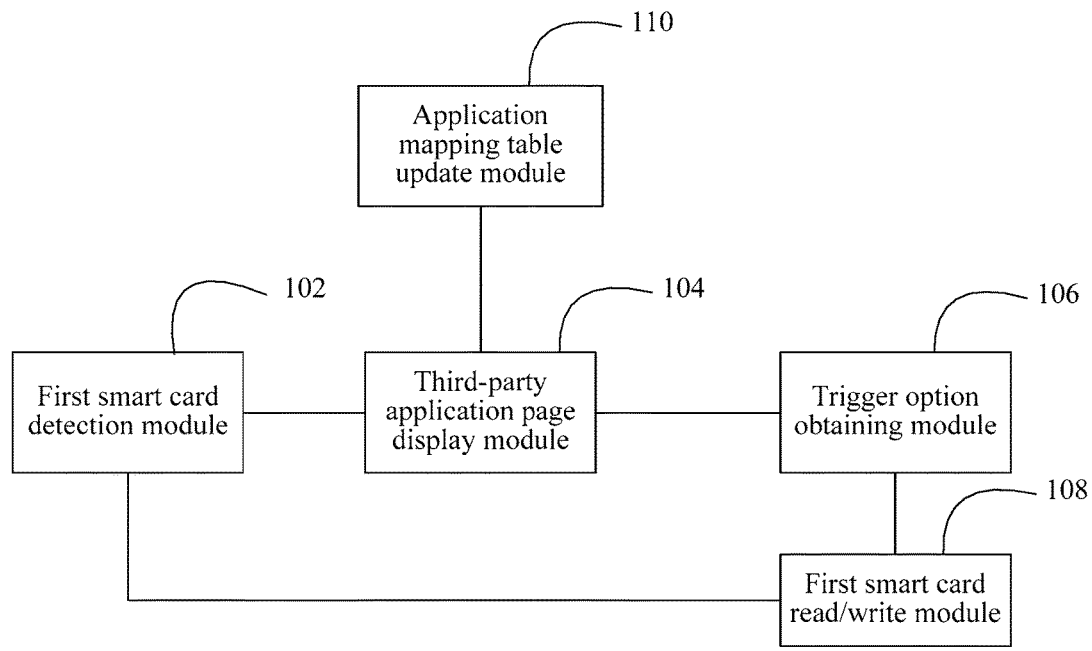
FIG. 6 is a schematic diagram of a first smart card read/write apparatus according to some embodiments.

To resolve the foregoing mentioned technical problem in the conventional technologies that extensibility is relatively poor for a manner of reading/writing a smart card by a platform application that integrates a function of reading/writing multiple smart cards, in an embodiment, a smart card read/write apparatus corresponding to the first smart card read/write method is provided. As shown in FIG. 6, the apparatus includes a first smart card detection module 102, a third-party application page display module 104, a trigger option obtaining module 106, and a first smart card read/write module 108.

The first smart card detection module 102 is configured to sense a touch event of a smart card, and obtain an application identifier corresponding to the touch event.

The third-party application page display module 104 is configured to: search for a third-party application link corresponding to the application identifier, and capture and display a web page corresponding to the third-party application link, the web page corresponding to the third-party application link including a function menu and an instruction script corresponding to options in the function menu, and the instruction script being preselected by a third-party application from a preset standard script library.

The trigger option obtaining module 106 is configured to: obtain an option triggered in the function menu on the web page corresponding to the third-party application link, and send a smart card control request to a platform application server by executing an instruction script corresponding to the triggered option.

The first smart card read/write module 108 is configured to: receive a smart card control instruction that is returned by the platform application server and that corresponds to the smart card control request, and invoke a corresponding interface function according to the smart card control instruction to read/write the smart card.

In this embodiment, the first smart card detection module 102 is further configured to sense a near field communication signal, and obtain the touch event of the smart card according to the near field communication signal.

In this embodiment, the third-party application page display module 104 is further configured to: obtain an application mapping table, the application mapping table storing the application identifier and the third-party application link corresponding to the application identifier; and search for, according to the application mapping table, the third-party application link corresponding to the application identifier.

In this embodiment, as shown in FIG. 6, the smart card read/write apparatus further includes an application mapping table update module 110, configured to regularly update the application mapping table.

In this embodiment, the third-party application page display module 104 is further configured to detect a loading completion event of the web page corresponding to the third-party application link, obtain an instruction script invoked by an event processing function of the loading completion event, send the smart card control request to the platform application server by executing the instruction script invoked by the event processing function, and invoke the first smart card read/write module.

Figure 7:
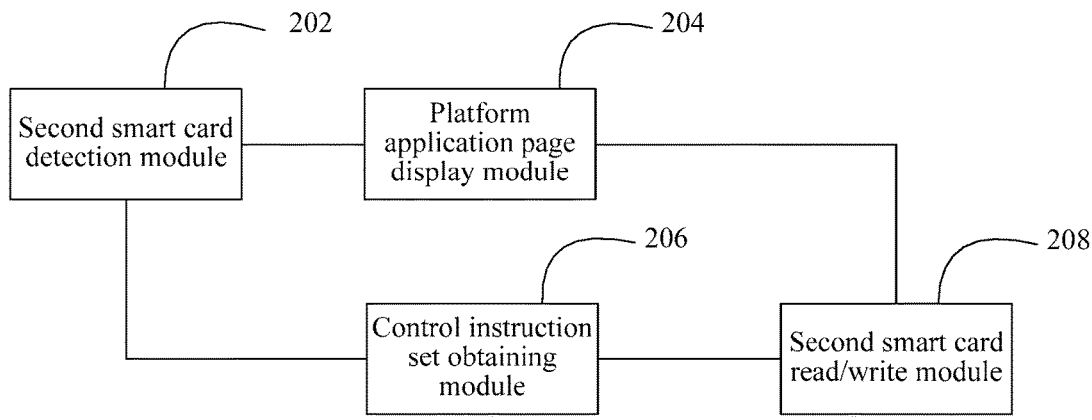
FIG. 7 is a schematic diagram of a second smart card read/write apparatus according to some embodiments.

To resolve the foregoing mentioned technical problem in the conventional technologies that extensibility is relatively poor for a manner of reading/writing a smart card by a platform application that integrates a function of reading/writing multiple smart cards, in an embodiment, a smart card read/write apparatus corresponding to the second smart card read/write method is provided. As shown in FIG. 7, the apparatus includes a second smart card detection module 202, a platform application page display module 204, a control instruction set obtaining module 206, and a second smart card read/write module 208.

The second smart card detection module 202 is configured to: sense a touch event of a smart card, and obtain an application identifier corresponding to the touch event.

The platform application page display module 204 is configured to display a page corresponding to the application identifier, the page including a predefined function menu.

The control instruction set obtaining module 206 is configured to obtain a control instruction set corresponding to the application identifier, the control instruction set being a set of smart card control instructions that are preselected by a third-party application from a preset standard instruction set and that correspond to options in the function menu on the page corresponding to the application identifier.

The second smart card read/write module 208 is configured to: obtain an option triggered in the function menu on the page, obtain a smart card control instruction that corresponds to the triggered option and that is in the control instruction set, and invoke a corresponding interface function according to the smart card control instruction to read/write the smart card.

In an embodiment, the control instruction set obtaining module 206 is configured to upload the application identifier to a platform application server. The platform application server obtaining a third-party application link corresponding to the application identifier, and capturing, according to the third-party application link, the control instruction set of the smart card control instructions corresponding to the options in the function menu.

The control instruction set obtaining module 206 is further configured to receive the control instruction set that is of the smart card control instructions corresponding to the options in the function menu and that is returned by the platform application server.

The embodiments of the present disclosure have the following beneficial effects:

According to the first and the second smart card read/write methods, for a third-party application newly extended in a platform application, instead of self-developing a set of corresponding program packages for a smart card driver according to service specifications of the third-party application, a developer of the newly extended third-party application needs to self-define a page and configure an instruction script or set a parameter of a function in a standard function library according to a standard page, based on a standard script library or the standard function library that has been provided by the platform application, to associate different services with a smart card read/write instruction that can be finally recognized by a client program of the platform application. Therefore, the program packages for the smart card driver related to the newly extended third-party application do not need to be installed on a terminal. This not only saves storage space of the terminal and avoids storage of a redundant driver package, but also facilitates extension of a new application (provided that the new application is registered on a platform application server), thereby improving extensibility of the platform application.

Figure 8:
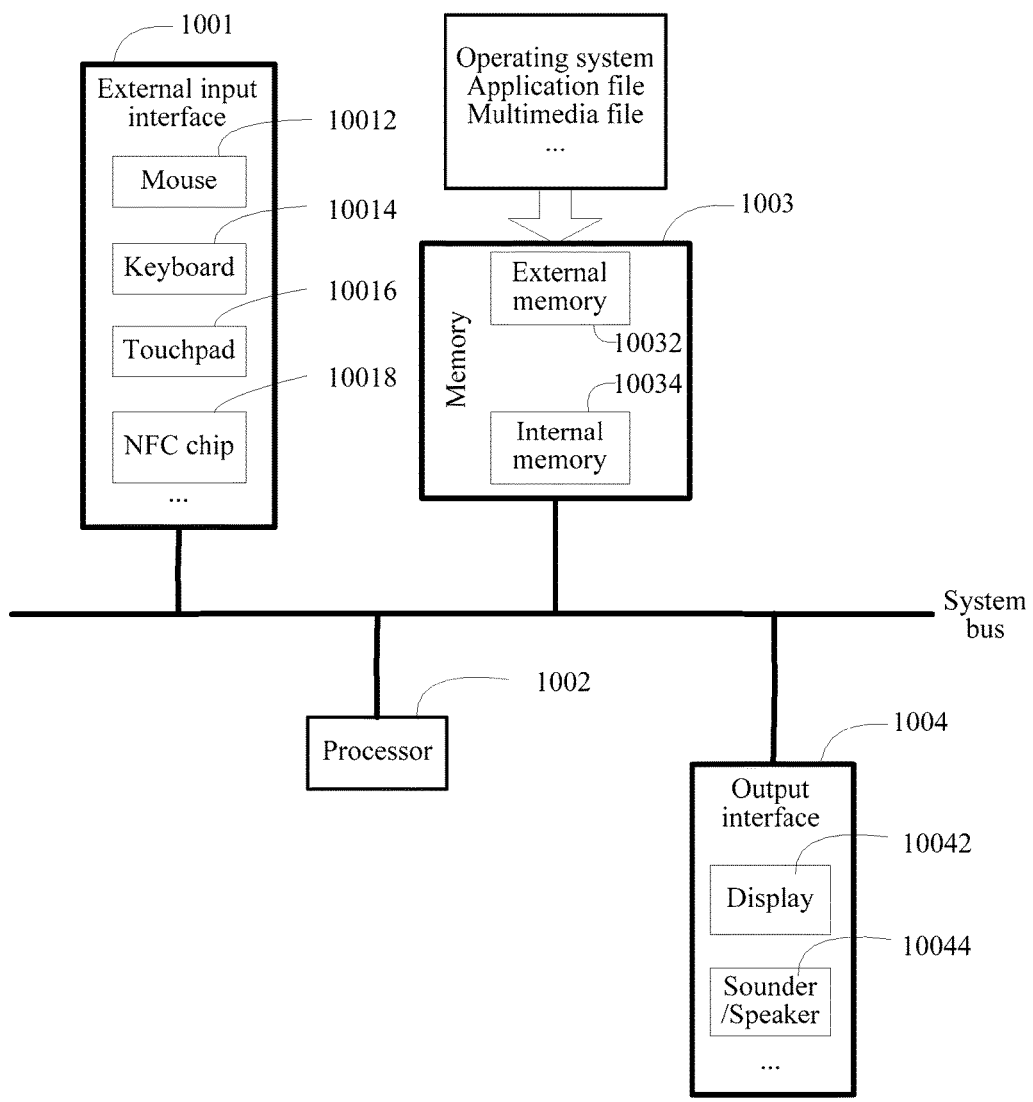
FIG. 8 is a schematic structural diagram of a computer device executing the first or the second smart card read/write method according to some embodiments.

In an embodiment, a terminal that is of a computer system based on a Von Neumann architecture and that performs the first or the second smart card read/write method is provided. The computer system may be a terminal device such as a smart phone, a tablet computer, a palmtop computer, a notebook computer, or a personal computer. FIG. 8 is a schematic structural diagram of the terminal 10. As shown in FIG. 8, specifically, an external input interface 1001, a processor 1002, a memory 1003, and an output interface 1004 that are connected by using a system bus may be included. Optionally, the external input interface 1001 may include at least one of a mouse 10012, a keyboard 10014, a touchpad 10016, or an NFC chip 10018. The memory 1003 may include an external memory 10032 (such as a hard disk, an optical disc, or a floppy disk) and an internal memory 10034. The output interface 1004 may include devices such as a display 10042 and a sounder/speaker 10044.

In this embodiment, the method may be performed based on a computer program. A program file of the computer program is stored in the external memory 10032 of the computer system 10 based on the Von Neumann architecture, is loaded to the internal memory 10034 during running, and is encoded as machine code so as to be transferred to the processor 1002 for execution. Therefore, the computer system 10 based on the Von Neumann architecture logically includes a first smart card detection module 102, a third-party application page display module 104, a trigger option obtaining module 106, and a first smart card read/write module 108, or a second smart card detection module 202, a platform application page display module 204, a control instruction set obtaining module 206, and a second smart card read/write module 208. In addition, during an execution process of the first or the second smart card read/write method, entered parameters are all received by using the external input interface 1001, transferred to the memory 1003 for storage, and input to the processor 1002 for processing. Processed result data is cached in the memory 1003 for subsequent processing or is transferred to the output interface 1004 for output.

In addition, a person skilled in the art may understand that a computer program used for implementing all or some steps in the foregoing method embodiments may be stored in a non-transitory computer readable storage medium. When the computer program is scheduled, the processes of the foregoing method embodiments may be executed by using hardware. The non-transitory computer readable storage medium may include but is not limited to a flash memory, a read-only memory (ROM), a random access memory (RAM), a magnetic disk, an optical disc, and the like. In addition, the computer readable storage medium may further be various recording media that can be accessed by a computer apparatus by using a network or a communications link, for example, a recording medium within which data can be extracted by using a router, the Internet, a local area network, or the like. Moreover, the computer readable storage medium may be multiple computer readable storage media located in, for example, a same computer system, or may be computer readable storage media distributed in multiple computer systems or computer apparatuses.

The foregoing descriptions are merely preferred embodiments of the present disclosure, but are not intended to limit the present disclosure. Therefore, equivalent changes made according to the claims of the present disclosure still fall within the scope of the present disclosure.

What is claimed is:

1. A smart card read/write method performed at a terminal having one or more processors and memory storing one or more programs to be executed by the one or more processors, the one or more programs including an instant messaging application that matches smart cards for multiple application types, the method comprising:
   detecting, using the instant messaging application, a near field communication signal from a first smart card;
   obtaining, using the instant messaging application, an application identifier corresponding to the first smart card from the near field communication signal, wherein the application identifier represents an application type corresponding to the first smart card, and the application identifier is stored on the first smart card;
   locating, using the instant messaging application, a third-party application link corresponding to the application identifier from a platform application server associated with the instant messaging application;
   capturing and displaying on the terminal a web page corresponding to the third-party application link within the instant messaging application, the web page comprising a function menu of options associated with the first smart card;
   obtaining, using the instant messaging application, a user-selected option triggered in the function menu on the web page corresponding to the third-party application link, wherein the user-selected option includes a read/write operation to be performed on the first smart card; and
   in response to the user-selected option:
      sending a smart card control request to the platform application server by executing an instruction script corresponding to the triggered option;
      receiving, from the platform application server, a smart card control instruction that corresponds to the smart card control request;
      executing, using the instant messaging application, the smart card control instruction, wherein the executing includes invoking a corresponding interface function according to the smart card control instruction to read/write the first smart card, and wherein the read/write includes receiving a result from the first smart card using the near field communication signal; and
      displaying the result on the web page.

2. The smart card read/write method according to claim 1, wherein the web page further includes an instruction script corresponding to the options in the function menu.

3. The smart card read/write method according to claim 2, wherein the instruction script is preselected by a third-party application from a preset standard script library.

4. The smart card read/write method according to claim 1, wherein the first smart card includes a near field communication chip, and detecting the near field communication signal from the first smart card includes detecting the near field communication signal from the chip.

5. The smart card read/write method according to claim 1, wherein the operation of locating, using the instant messaging application, the third-party application link corresponding to the application identifier comprises:

obtaining an application mapping table, the application mapping table storing the application identifier and the third-party application link corresponding to the application identifier; and searching for, according to the application mapping table, the third-party application link corresponding to the application identifier; and the method further comprises:

regularly updating the application mapping table.

6. The smart card read/write method according to claim 1, wherein the operation of capturing and displaying on the terminal the web page comprises:

detecting a loading completion event of the web page corresponding to the third-party application link; and obtaining an instruction script invoked by an event processing function of the loading completion event, sending the smart card control request to the platform application server by executing the instruction script invoked by the event processing function, and performing the operation of receiving a smart card control instruction that is returned by the platform application server and that corresponds to the smart card control request.

7. A smart card read/write apparatus, comprising:

one or more processors;

memory; and one or more programs stored in the memory, the one or more programs including an instant messaging application that matches smart cards for multiple application types that, when executed by the one or more processors, cause the smart card read/write apparatus to perform a plurality of operations including:

detecting, using the instant messaging application, a near field communication signal from a first smart card;

obtaining, using the instant messaging application, an application identifier corresponding to the first smart card from the near field communication signal, wherein the application identifier represents an application type corresponding to the first smart card, and the application identifier is stored on the first smart card;

locating, using the instant messaging application, a third-party application link corresponding to the application identifier from a platform application server associated with the instant messaging application;

capturing and displaying on the terminal a web page corresponding to the third-party application link within the instant messaging application, the web page comprising a function menu of options associated with the first smart card;

obtaining, using the instant messaging application, a user-selected option triggered in the function menu on the web page corresponding to the third-party application link, wherein the user-selected option includes a read/write operation to be performed on the first smart card; and in response to the user-selected option:

sending a smart card control request to the platform application server by executing an instruction script corresponding to the triggered option;

receiving, from the platform application server, a smart card control instruction that corresponds to the smart card control request;

executing, using the instant messaging application, the smart card control instruction, wherein the executing includes invoking a corresponding interface function according to the smart card control instruction to read/write the first smart card, and wherein the read/write includes receiving a result from the first smart card using the near field communication signal; and displaying the result on the web page.

8. The smart card read/write apparatus according to claim 7, wherein the web page further includes an instruction script corresponding to the options in the function menu.

9. The smart card read/write apparatus according to claim 8, wherein the instruction script is preselected by a third-party application from a preset standard script library.

10. The smart card read/write apparatus according to claim 7, wherein the first smart card includes a near field communication chip, and detecting the near field communication signal from the first smart card includes detecting the near field communication signal from the chip.

11. The smart card read/write apparatus according to claim 7, wherein the operation of locating, using the instant messaging application, the third-party application link corresponding to the application identifier comprises:

obtaining an application mapping table, the application mapping table storing the application identifier and the third-party application link corresponding to the application identifier; and searching for, according to the application mapping table, the third-party application link corresponding to the application identifier; and the plurality of operations further comprises:

regularly updating the application mapping table.

12. The smart card read/write apparatus according to claim 7, wherein the operation of capturing and displaying on the terminal the web page comprises:

detecting a loading completion event of the web page corresponding to the third-party application link; and obtaining an instruction script invoked by an event processing function of the loading completion event, sending the smart card control request to the platform application server by executing the instruction script invoked by the event processing function, and performing the operation of receiving a smart card control instruction that is returned by the platform application server and that corresponds to the smart card control request.

13. A non-transitory computer readable storage medium, configured to store one or more programs, the one or more programs including an instant messaging application that matches smart cards for multiple application types that, when executed by one or more processors of a smart card read/write apparatus, cause the smart card read/write apparatus to perform a plurality of operations including:

detecting, using the instant messaging application, a near field communication signal from a first smart card;

obtaining, using the instant messaging application, an application identifier corresponding to the first smart card from the near field communication signal, wherein the application identifier represents an application type corresponding to the first smart card, and the application identifier is stored on the first smart card;

locating, using the instant messaging application, a third-party application link corresponding to the application identifier from a platform application server associated with the instant messaging application;

capturing and displaying on the terminal a web page corresponding to the third-party application link within the instant messaging application, the web page comprising a function menu of options associated with the first smart card;

obtaining, using the instant messaging application, a user-selected option triggered in the function menu on the web page corresponding to the third-party application link, wherein the user-selected option includes a read/write operation to be performed on the first smart card; and in response to the user-selected option:

sending a smart card control request to the platform application server by executing an instruction script corresponding to the triggered option;

receiving, from the platform application server, a smart card control instruction that corresponds to the smart card control request;

executing, using the instant messaging application, the smart card control instruction, wherein the executing includes invoking a corresponding interface function according to the smart card control instruction to read/write the first smart card, and wherein the read/write includes receiving a result from the first smart card using the near field communication signal; and displaying the result on the web page.

14. The non-transitory computer readable storage medium according to claim 13, wherein the web page further includes an instruction script corresponding to the options in the function menu.

15. The non-transitory computer readable storage medium according to claim 14, wherein the instruction script is preselected by a third-party application from a preset standard script library.

16. The non-transitory computer readable storage medium according to claim 13, wherein the first smart card includes a near field communication chip, and detecting the near field communication signal from the first smart card includes detecting the near field communication signal from the chip.

17. The non-transitory computer readable storage medium according to claim 13, wherein the operation of locating, using the instant messaging application, the third-party application link corresponding to the application identifier comprises:

obtaining an application mapping table, the application mapping table storing the application identifier and the third-party application link corresponding to the application identifier; and searching for, according to the application mapping table, the third-party application link corresponding to the application identifier; and the plurality of operations further comprises:

regularly updating the application mapping table.

18. The non-transitory computer readable storage medium according to claim 13, wherein the operation of capturing and displaying on the terminal on the terminal the web page comprises:

detecting a loading completion event of the web page corresponding to the third-party application link; and obtaining an instruction script invoked by an event processing function of the loading completion event, sending the smart card control request to the platform application server by executing the instruction script invoked by the event processing function, and performing the operation of receiving a smart card control instruction that is returned by the platform application server and that corresponds to the smart card control request.

* * * * *